United States Patent

Sato et al.

[11] 4,214,952
[45] Jul. 29, 1980

[54] ELECTROCHEMICAL TREATMENT PROCESS

[75] Inventors: Mitsuhiro Sato, Aichi; Noboru Kasahara, Ohbu, both of Japan

[73] Assignee: NGK Insulators, Ltd., Nagoya, Japan

[21] Appl. No.: 929,448

[22] Filed: Jul. 31, 1978

[30] Foreign Application Priority Data

Feb. 28, 1978 [JP] Japan .................................. 53-22586

[51] Int. Cl.² .......................... C25C 1/00; C25D 5/00; C25D 11/02; C25F 3/00
[52] U.S. Cl. ................................... 204/14 R; 204/58; 204/105 R; 204/129.1; 204/277
[58] Field of Search ................... 204/25, 58, 273, 277, 204/129.1, 105 R, 106, 114, 129.5, 14

[56] References Cited

U.S. PATENT DOCUMENTS

| | | | |
|---|---|---|---|
| 3,284,327 | 11/1966 | Maeda et al. | 204/277 |
| 3,378,473 | 4/1968 | Inoue | 204/277 |
| 3,875,041 | 4/1975 | Harvey | 204/273 |
| 3,933,601 | 1/1976 | Ishibashi | 204/25 |
| 3,959,112 | 5/1976 | Arend, Jr. | 204/273 |

FOREIGN PATENT DOCUMENTS

727749  4/1955  United Kingdom ..................... 204/58

*Primary Examiner*—T. M. Tufariello
*Attorney, Agent, or Firm*—Stevens, Davis, Miller & Mosher

[57] ABSTRACT

Electrochemical treatment process is characterized in that said treatment is carried out by containing 2–60 v/v % of dispersed bubbles having the first quartile diameter being not more than 2,000 μm in the electrolyte solution and by applying voltage.

17 Claims, 6 Drawing Figures

ELECTROCHEMICAL TREATMENT PROCESS

The present invention relates to the electrochemical treatment processes of anodizing, electrolytic precipitation and electrolytic dissolution.

The increase of the treatment speed of the electrochemical treatments is commercially advantageous. To such treatments, Farady's law of electrolysis can be generally applied, so that the increase of the treatment speed can be attained by increasing the electric current density but when the electric current density is merely increased, the movement of the electrolyte ion can not catch up with the electric current density and the reaction can not be normally maintained and the burning, the powdery oxidation coatings, the decrease of abrasion resistance and the like occur and unsatisfactory quality is obtained, so that there is the limiting electric current density. This reason is presumably based on the following fact. The boundary layer of only laminer flows is present in the treating solution in contact with the metal surface and in the boundary layer, the movement of substances in the perpendicular direction from the metal surface hardly occurs and the movement of the electric current transferred by the electrolyte ion in the boundary layer is restrained, so that the reaction is rate-determined therein.

Furthermore, when the electric current density is merely increased, the reaction heat and Jouele's heat are increased and in particular, in the anodizing, the amount of heat generated is large, so that if the heat dissipation is not effected effectively, the temperature at the metal surface to be treated is raised and ultimately the boiling of the electrolyte may occur, so that the limit is caused in the electric current density owing to the thermal function.

Furthermore, heretofore, in order to obtain a hard coating in the anodizing of aluminum or aluminum alloys, the treatment temperature must be low and a large scale of cooling installation is needed, so that if it is possible to effect the anodizing without lowering the treatment temperature, this is commercially very advantageous and the realization has been demanded.

The previously known main attempts for solving the above described defects in the electrochemical treatments, such as the anodizing involve a process of agitating the treating solution and a device of process for flowing electric current. As the process for agitating the treating solution, air-agitating, mechanical agitating, jetting of the treating solution, high frequency vibration and the like have been known, but the satisfactory effect has never been attained. The device of process for flowing the electric current is disclosed in British Pat. No. 727,749, which is the constant wattage process. This process also has not attained the satisfactory effect.

The present invention consists in the electrochemical treatment process wherein the boundary layer portion present in the vicinity of the metal surface to be treated is made to be in turbulent flow which has never been obtained by the conventional agitating processes, the movement of ion is improved to increase the limiting speed of the reaction and at the same time to improve the thermal transmission, for example the heat generated in the inner portion of the coating is rapidly dissipated and the formation reaction is normally maintained, the pump function when very fine bubbles pass in contact with, for example the openings of fine pores of an anodized coating, and the pulsatory current function are increased and the electrolytic potential is increased and the treating solution contains 2–60 v/v% (volume/volume %), preferably 2–40 v/v% and more preferably 2–30 v/v%, of dispersed bubbles having the first quartile diameter of not more than 2,000 micro meter ($\mu$m), preferably not more than 1,000 $\mu$m in the treating solution in the electrochemical treatment wherein voltage is applied while forming bubbles in the treating solution.

The invention will be explained in detail hereinafter. For the movement of the boundary layer, the agitating which has been heretofore conducted and merely moves the solution, is insufficient and the causing of the turbulent flow due to replacement of the phase of ultra fine bubbles as in the present invention is effective and it is necessary that the gas-liquid interface dimensions of more than a given amount pass continuously in the vicinity of the surface of materials to be treated. As the bubble diameter becomes smaller, the interface dimension per a given volume of the bubbles increases. That is, the interface dimension of the bubbles is inversely as the bubble diameter. Accordingly, in order to enlarge the interface dimension, the bubble diameter must be smaller and when the diameter of the dispersed bubbles is uneven, the bubbles having the smaller diameter greatly contribute to the interface dimension, so that the bubbles having the smaller diameter must be taken into consideration.

When the bubbles in the dispersed bubbles contact in the horizontal direction with one another in the course of floating up in the treating solution due to buoyancy, the bubbles are repelled with one another, while when the bubbles contact in the vertical direction, the bubbles are united to become bubbles having a larger diameter and the interface dimension is decreased. However, the elevating speed of the bubbles is in propertion to square of the bubble diameter, so that as the bubble diameter is smaller, the elevating speed is considerably decreased and the tendency of uniting of bubbles due to the difference of the elevating speed proceeds very gradually, so that the life of the bubbles until the uniting occurs, becomes long and actually circulating flows are caused owing to the dispersed bubbles, so that the bubbles are flowed mounting on the circulating flows and this speed is far larger than the elevating speed of the fine bubbles, so that the uniting of the fine bubbles is negligible and even if the depth of the treating bath becomes 8 m, the satisfactory broadness of the interface dimension even at the upper portion of the treating solution is maintained. When it is assumed that there is no circulating flow, if the bubbles having a small diameter are formed continuously from a given amount of supplied gas, the ratio of the dispersed bubbles in the treating solution exceeds 100 v/v%, but said bubbles are flowed by this circulating flow in turn, so that the ratio of the bubbles in the treating solution becomes less than 60 v/v%. For example, if the amount of gas supplied per unit area of the treating bath is 2 Nl/min.dm$^2$ (normal liter per minute square deci meter) by using the treating solution of 30 w/v% (weight/volume %) of sulfuric acid without adding an organic substance, said ratio becomes about 12 v/v%.

In the present invention, the amount of gas supplied per unit area of the treating bath of 0.5–15 Nl/min.dm$^2$ may be employed.

The diameter of the bubbles formed from the pores can be theoretically calculated from the following formula by balance of the buoyancy of the bubbles and the surface tension against the porous body.

$$gp \cdot (\pi/6) \cdot D^3 = \sigma \pi \, d\cos\theta$$

wherein g is gravitation constant (cm/sec$^2$), $\rho$ is density (g/cm$^3$) of a solution, D is bubble diameter (cm), $\sigma$ is surface tension (dyne/cm) of a solution, d is pore diameter (cm) and $\theta$ is angle of contact (degree).

As the process for measuring the bubble diameter, one of two equilateral sides of each of two rectangular prisms is oppositely mounted on a horizontal plane respectively at a distance and a light ray from a light source is incident on one of the prisms at right angles to said equilateral side through a condenser lense. The light ray reflected by the prism is passed through the treating solution and then is incident on the other prism. The light ray reflected upward from the latter prism is incident on a camera, which is focused at the bubble in the treating solution, so as to take a photograph of the bubble and the bubble diameter in the taken photograph is measured. When the thus measured diameter is compared with the value obtained from the above described theoretical formula, it was confirmed that both the values are very similar.

As the means for forming the bubbles in the present invention, ceramic or carbonaceous porous body having an average pore diameter of 0.5–25 $\mu$m is used and the shape of the porous body, when particularly the pore diameter is small, is preferred to be cylinder in view of the strength against air pressure pumped into the inner portion of the porous body but a plate-shaped porous body may be provided at the whole surface of the bottom of the treating bath by applying a proper reinforcement. Furthermore, plastic sintered porous bodies, such as polyethylene, polypropylene, polystyrene, polytetrafluoroethylene and the like may be used. In addition, porous sintered bodies of acid resistant metals, such as titanium, niobium, tantalum, zirconium, hafnium, vanadium, stainless steel and the like, or these metal thin plates wherein a large number of pores having about 20 $\mu$m diameter are perforated in a given distance by photoetching may be used. When lead, nickel, cobalt or gold thin porous plate wherein a large number of pores having about 20 $\mu$m diameter are provided at a distance of 0.5 mm by electroforming in such a state that the inner circumference of the pore projects in crateriform of volcano, is arranged at the bottom surface of the treating bath or these thin plates are arranged in a cylindrical form and bubbles are formed, it is possible to obtain smaller bubbles than bubbles formed from the above described porous bodies having the same pore diameter. This is because the circumference of the pore is crateriform, so that the bubbles are more rapidly left off from the pores than the case of plane and before the bubbles grow to a certain size, the bubbles are left off from the surface of porous body.

For making the bubble diameter more small, porous bodies obtained by molding polyethylene, polypropylene, polystyrene or polytetrafluoroethylene by using a mold produced by electroforming wherein pores project in crateriform of volcano are more effective. This is because the porous bodies composed of these materials are larger in the angle of contact of bubbles, so that the above described effect is more promoted.

In the above described porous bodies, in the case of cylindrical form the end portion is sealed, and in the case of plate-form, two plates are arranged at a proper distance and the distancing portions at the end are sealed or one of the two plates is replaced with an airtight plate. Into the inner space of these porous bodies is pumped a gas, such as pressured air.

In the case of porous bodies having an average pore diameter of somewhat larger than 25 $\mu$m, rather than pressured air is directly pumped into the porous bodies, a gas is dissolved in the treating solution under pressure and then the treating solution is jetted circularly into an electrolytic bath through pores of the porous body and in this case the pressure is reduced and the thus separated and formed bubbles are utilized. Such a procedure is effective in view of obtaining bubbles having smaller diameters and in this case, carbon dioxide gas is more preferable in view of the solubility to water.

The above described porous bodies are usually arranged at the bottom portion of the treating bath, but may be arranged together at side portion of the bath or rack. Particularly, when the outer diameter of the cylinder is made to be small and such cylinders are arranged in multi-stage at the bath bottom zone or a large number of band-shaped porous plates, both surfaces being porous are arranged in parallel in the thick direction in such a manner that the breadth direction positions vertically and the longitudinal direction positions horizontally, whereby the outlets of the bubbles are toward the horizontal direction, the bubbles are left off and float from the surfaces of the porous bodies at early stage owing to the circulating flow of the treating solution, whereby the bubble diameter can be effectively made smaller.

Furthermore, in the cylindrical porous body, a bubble cutting brade may be provided arround said porous body and the bubbles at the porous body surface are cut by said brade rotating arround the porous body.

Moreover, the same effect can be obtained by rotating the cylyindrical porous body at a revolution speed of 20–500 r.p.m. in the electrolyte solution by making the cylinder axis as the rotary axis. In this case, precaution should be taken into the air-tightness of the rotary seal portion.

The same effect can be obtained by rotating at a revolution speed of up to about 100 r.p.m. in the treating solution the cylindrical porous body by rendering the rectangular direction to the cylinder axis as the rotary axis or the plate-shaped porous body by providing the rotary axis at the rectangular direction to the plane of the plate-shaped porous body.

The pressured air may be supplied from the outside of the cylindrical porous body and dissolved in the electrolyte solution flowing through the inner space portion of the porous body or mixed in the solution as bubbles and then introduced into the treating bath.

Furthermore, it is effective to make the bubble diameter formed from the pores of the porous bodies smaller that vibration having a frequency of 10–200 Hz is given to the above described porous bodies. Besides this, it disturbs the elevating course of bubbles in the treating solution and disperses bubbles throughly in the treating solution that the vibration having a frequency of 10–200 Hz is given to materials to be treated or a vibrating plate is immersed in the treating solution and the vibration having a frequency of 10–200 Hz is given to the treating solution, so that the bubbles uniformly contact with every portion of the materials to be treated and the effect to make the boundary layer portion into turbulent flow due to passing of the ultra fine bubbles through the surface of the materials to be treated, which is aimed in the present invention, is preferably developed. The frequency used herein does not give the adverse influence that the vibration energy is converted into the heat energy to raise the temperature of the treating solution as in the ultrasonic wave vibration.

The present invention relies upon the above described various bubble-forming means and the presence of bubbles having a diameter of less than 2,000 μm as shown in the following Table 1 in the theoretical calculation or the practical measurement by using the photograph process has been confirmed. As the bubbles ascend in the treating solution, the pressure due to the depth of the solution decreases, so that the volume of the bubble expands and the diameter of the bubble becomes larger but even if the bubbles ascend 8 m of depth; the bubble diameter becomes only 1.22 times as large as the original bubble diameter.

as described above is substantially negligible, so that it has been found that it is practically advantageous and further rather convenient from the following reason that the unevenness is permitted in the bubble diameter. That is, when there is difference in the floating velocity of every bubble, the bubbles interfer with one another to disturb the floating course and the treatment having good uniformity can be effected.

Then, an experiment has been made by varying the ratio of the total volume of bubbles having diameter of not more than 2,000 μm to the total volume of all the dispersed bubbles and as the results, the difference has been found in the limiting electric current density as shown hereinafter. That is, when 30 w/v% of aqueous solution of sulfuric acid was used as the treating solution, the amount of air supplied per unit area of the bath was 2 Nl/min.dm$^2$, the volume ratio of the dispersed Table 1

| | | | | Average diameter of dispersed bubbles formed from inorganic porous bodies into various treating solutions | | | |
|---|---|---|---|---|---|---|---|
| | | | Treating solution | Sulfuric acid 30 W/V % | | Sulfuric acid 30 W/V % Glycerine 20 W/V % | |
| | | | Solution temperature | 20° C. | | 5° C. | |
| | Porous body | | | 10 cm above porous body | 800 cm above porous body | 10 cm above porous body | 800 cm above porous body |
| No. | Maximum pore diameter (μm) | Average pore diameter (μm) | Porosity (%) | Average bubble diameter (μm) | | Average bubble diameter (μm) | |
| 1 | 60 | 50 | 38 | 1,680 | 2,550 | 2,000 | 2,600 |
| 2 | 37 | 30 | 40 | 1,320 | 2,000 | 1,600 | 2,200 |
| 3 | 30 | 25 | 40 | 1,200 | 1,500 | 1,400 | 2,050 |
| 4 | 25 | 20 | 45 | 1,060 | 1,800 | 1,300 | 2,000 |
| 5 | 12 | 10 | 45 | 870 | 1,310 | 1,040 | 1,600 |
| 6 | 10 | 7 | 59 | 780 | 1,150 | 939 | 1,400 |
| 7 | 2.5 | 2 | 49 | 530 | 750 | 636 | 954 |
| 8 | 1.0 | 0.8 | 42 | 400 | 600 | 460 | 690 |

When the coefficient of mass transfer $K_L$ (cm/sec) when the bubble diameter is varied in single bubble was measured by absorption of carbon dioxide gas into water, the results as shown in FIG. 1 were obtained. As seen from FIG. 1, the coefficient of mass transfer gradually increases at not more than 4,000 μm of the bubble diameter and suddenly increases from not more than 2,000 μm of the bubble diameter and becomes maximum at not more than 1,000 μm of the bubble diameter. Since the coefficient of mass transfer corelates to the heat transmission, this shows that the use of the bubbles having diameter of not more than 2,000 μm, particularly not more than 1,000 μm is advantageous.

Thus, the bubbles having the smaller diameter are more valuable. When the diameter of every bubble in the dispersed bubbles is uniform, it seems that the floating velocity of every bubble becomes equal and the uniting of bubbles does not occur and the dispersability becomes stable and such a case is preferable, but the relative speed of every bubble in the circulating flow to the treating solution in this case becomes only the static float velocity of each bubble and every bubble floats up softly at the equal disposal without interferring with one another and the disturbance is few. Thus, the mixing in the treating solution becomes few, so that even if the bubble diameter is made to be uniform, the effect proportional to the uniformity can not be expected and it is practically difficult to make the bubble diameter uniform, accordingly in the present invention the improvement in the state where there is unevenness in the bubble diameter, has been attempted.

At the bubble diameter of about 2,000 μm, even if there is a certain degree of unevenness in the bubble diameter, the disadvantage due to the uniting of bubbles bubbles in the treating solution was 12±2%, anodizing was carried out at various electric current densities and the limiting electric current density was determined, the results as shown in FIG. 2 were obtained. In FIG. 2, the black points show when the appearance of the coating is burnt and the coating is bad and the white circles show the sound coating. This shows that is the ratio of the total volume of the bubbles having diameter of not more than 2,000 μm to the total volume of the dispersed bubbles is not more than 25%, the bubbles which have the function capable attaining the effect of the present invention are few and the limiting electric current density lowers. Accordingly, it has been found that it is necessary in order to obtain the effect aimed in the present invention to effect the treatment by making the ratio more than 25%. In the same manner, an experiment has been made by varying the ratio of the total volume of the bubbles having diameter of not more than 1,000 μm to the total volume of the dispersed bubbles and the same tendency as in the above described case of the diameter of not more than 2,000 μm has been obtained. It is practically feasible to carry out the treatment by making the ratio more than 25% and this means that when the first quartile diameter is not more than 2,000 μm, preferably not more than 1,000 μm, the above described limiting electric current density is increased.

Furthermore, it is necessary that the interface area of the bubbles is more than a given limit and this can be attained by making the ratio of the bubbles in the treating solution to be more than 2 v/v%. When said ratio exceeds 60 v/v%, as the ratio increases, the circulating flow becomes fast and the bubbles are rapidly carried off to the surface of the treating solution and the bubbles are broken and disappear at the solution surface and a large amount of air supplied is needed. If a large amount of bubble stabilizer is used, the disappearance of the bubbles is not satisfactorily effected and a bubble layer grows and the effect to the boundary layer is not so much increased, so that the ratio is sufficient in a value of up to 60 v/v%. The ratio of 2-40 v/v% is preferable and 2-30 v/v% is more preferable.

As the treating solution to be used when the present invention is applied to the anodizing, mention may be made of sulfuric acid, oxalic acid, phosphoric acid, benzenesulfonic acid, sulfamic acid, boric acid, ammonium borate, citric acid, tartaric acid, formic acid, succinic acid and/or chromic acid. The temperature of the treating solution is usually from 0° C. to room temperature but the treatment may be effected at a temperature from room temperature to 100° C. depending upon the kind of the treating solution. That is, when sulfuric acid, oxalic acid, phosphoric acid, benzenesulfonic acid and/or sulfamic acid, which are most usually used, the treatment is carried out at a room temperature or a temperature of lower than room temperature. When acids having a dissociation constant of less than $1 \times 10^{-3}$ at 25° C., such as boric acid, ammonium borate, ammonium carbonate, citric acid, succinic acid, tartaric acid and/or formic acid are used, the treatment may be effected at a temperature from room temperature to 100° C. This range of temperature has the merit that a large size of cooling installation for holding the treating solution at a temperature of 0° C. or lower which has been heretofore desired for forming an anodized hard coating, is not necessary.

The electric current density to be used in the present invention is usually 3 A/dm$^2$ to 60 A/dm$^2$ under the above described temperature condition and even 80 A/dm$^2$ may be used by decreasing the treatment temperature. In particular, when the process of the present invention is applied while running aluminum wire or strip at a large relative velocity to the treating solution, the electric current density of about 170 A/dm$^2$ may be used, the "powdery coating oxidation" and "burning" phenomena of the coating heretofore formed under such temperature condition and electric current density can be prevented by containing the total volume of the above described bubbles having a diameter of not more than 2,000 μm in an amount of more than 25% based on the total amount of the dispersed bubbles, that is rendering the first quartile diameter to be not more than 2,000 μm and further rendering the ratio of the bubbles in the treating solution to be 2-60 v/v%, whereby the function of the ion acting the formation is increased and the heat generated in the inner portion of the coating is effectively dissipated, and further the dense coating can be obtained at a high speed.

The anodizing among the present invention can be applied to all the practically used aluminum and aluminum alloys. In particular, the present invention can be applied to a cast aluminum alloy containing about 20% of silicon which has been heretofore difficult in the formation of coating. Furthermore, to high strength cast aluminum alloy containing 12% of copper and highly strong and heat resistant aluminum alloy containing 2% of nickel, 4% of copper and 1% of silicon, good coatings can be formed. The coatings obtained by treating these materials with the method of the present invention are equal or higher in the adhesion, hardness, abrasion resistance, heat insulation and corrosion resistance than the coatings obtained by the conventional technics and these excellent properties can be obtained in a higher speed.

The anodizing according to the present invention can be applied to powder sintered bodies composed of aluminum or aluminum alloys. The formed coatings obtained by applying the anodizing according to the present invention to said powder sintered bodies, when the sintered bodies are porous, are formed to a fairly deep portion through the opened pores and the adhesion and hardness are satisfactory and when the porous sintered bodies treated with the method of the present invention are used in oil lubrication, the lubricating oil is apt to be held in the opened pores and further the coatings are high in the abrasion resistance, so that the obtained products show good abrasion resistance.

Similarly, the present invention can be applied to powder sintered bodies, castings, electrolytic precipitated products, hot sprayed products obtained by dispersing abrasion resistant and antifrictional particles, such as alumina, silicon carbide, asbestos, molybdenum disulfide, carbon and the like in aluminum or aluminum alloys, and ones obtained by infiltrating aluminum or aluminum alloys in opened pores of porous bodies composed of abrasion resistant and antifrictional particles, such as alumina, silicon carbide, asbestos, molybdenum disulfide. That is, since the particles to be used herein are inactive to the treating solution, the formation reaction of aluminum or aluminum alloy portion is feasible.

Other than the above described aluminum or aluminum alloys, the present invention can be applied to beryllium, beryllium alloys, magnesium, magnesium alloys, titanium, titanium alloys, niobium, niobium alloys, tantalum, tantalum alloys, zirconium, zirconium alloys, hafnium, hafnium alloys, vanadium, vanadium alloys, tungsten, tugsten alloys, molybdenum, molybdenum alloys, lead, lead alloys and the like, and composite materials, such as powder sintered bodies, castings, electrolytic precipitated products, hot sprayed products and infiltrated products composed of metals in which the dissolution is not substantially effected upon anodizing, such as alloys of combination of these metals. In particular, the products obtained by treating the composite material of lead with the method of the present invention are good in the heat dissipation and excellent in the abrasion resistance against rubbing even under high load and high speed.

Furthermore, in titanium, noibium and tantalum, withstand voltage and dielectric constant are increased and these products are useful as condenser.

As the materials to be treated, ones obtained by coating surfaces of the materials with aluminum by means of dry plating, electrolytic plating by means of non-aqueous solution, hot spraying or dipping may be used and the thus obtained materials are subjected to anodizing by the method of the present invention. In particular, when aluminum is melt coated on steels and the aluminum coated steels are treated with the method of the present invention to form anodized coating, the heat resistance and the resistance to hot soil adherence are improved.

Similarly, the present invention can be applied to powder moldings, powder sintered bodies, coatings, injection moldings, hot sprayed products and infiltrated products composed of aluminum or aluminum alloys, and antifrictional plastics, such as polyethylene, polypropylene, polyamides, polyacetal, polytetrafluoroethylene. In the composite materials of these antifrictional plastics, the products obtained by treating with the method of the present invention are light weight and rich in the abrasion resistance and many products can be used in non-feeding oil.

When the above described powder sintered bodies composed of aluminum or aluminum alloys or the above described composite materials are subjected to the anodizing according to the present invention and then the obtained materials are subjected to infiltration or electrolytic precipitation by using lead, tin or the alloy of these metals, the obtained products are more improved in the abrasion resistance than ones obtained by treating the previously formed composite materials with the anodizing according to the present invention and can be used under high loads without supplying oil.

If the anodizing according to the present invention is used, the mechanical application can be broadened by utilizing the high hardness, and further since the electrolytic voltage can be increased, the barrier layer of the coating can be increased and the dielectric strength is increased, so that the electric property is also improved. In the application wherein the coating is used as the electric insulating layer, if the dielectric strength is increased by thickening only the barrier layer, the electrostatic capacity between the base of aluminum and the barrier layer is not negligible and such a coating may not be used for a circuit substrate because of presence of the floating electrostatic capacity. For solving this problem, the method according to the present invention can be applied. In the condition for forming the porous type coating, according to the method of the present invention the thick coating can be easily formed, so that even if a conductive ciruit is provided on the coating surface, the distance between the aluminum base and the circuit through the coating can be enlarged and the electrostatic capacity is negligible and at the same time the barrier layer can be thickened and the dielectric strength can be satisfied.

This is further developed and a material to be treated in which a thick coating has been formed under the condition for forming a porous layer type coating, may be further transferred into the treating solution to form the barrier type layer and treated while further increasing the electrolytic voltage.

In the anodizing according to the present invention, the decrease of solid-liquid interface tension of the treating solution enlarges the contact angle of bubbles against the porous body and is effective for making the pore diameter smaller from the theoretical formula of the diameter of the bubbles formed from the pores and a surface active agent stable to an electrolyte can be selected and added to the treating solution. As this one embodiment, glycerine of less than 15 w/v% may be used. The increase of the viscosity of the treating solution and the use of an interface adsorbing substance of bubble make the dispersed bubbles formed from the porous body stable and restrain the tendency that the bubbles are united to form the bubbles having a larger diameter and restrain the decrease of the interface dimension of the bubbles, so that such procedures are convenient. As an embodiment of this object, saponin, such as hederin ($C_{41}H_{66}O_{12}$), crystal violet ($C_{25}H_{30}ClN_3$), higher alcohols, such as butyl alcohol, glycols, such as ethylene glycol, arabit ($C_5H_{12}O_5$), glycerine and the like may be added. In particular, the higher alcohols have the debubbling ability, so that the use of said alcohols is advantageous in handling. Furthermore, the stability varies depending upon the component of the treating solution and oxalic acid and the other organic acids are better in the stability of the dispersed bubbles than sulfuric acid and the bubble diameter in the vicinity of the material to be treated is smaller.

The above explanation was mainly made with respect to the anodizing of aluminum or aluminum alloys but the treatment of the present invention can be applied to electrolytic machinings, such as general electro-plating, alloy electroplating, electroforming, electrolytic refining of metals, sodium electrolysis, electrolytic precipitation of secondary battery, electrolytic polishing, electrolytic cutting and the like and in these applications, the turbulent flow at the boundary layer portion, which rate-determines the reaction, also occurs in the same manner as in the anodizing, so that the surprising commercially advantageous effect as compared with the conventional process can be brought about as mentioned above. That is, the increase of the limiting electric current density, the improvement of throwing power, the improvement of current efficiency, the expansion of bright electric current density range, the decrease of electrolytic resistance, the uniformity of composition in alloy electroplating and the uniform dispersibility in the compound electroplating are very advantageous effects in the electrolytic precipitation industry.

The introduction of bubbles into the electroplating solution has been heretofore carried out but in this means, bores having a diameter of 1–3 mm are perporated at chemicals resistant pipes, such as vinyl chloride and bubbles having a diameter of about 4 mm are formed and this is merely agitating of the solution and the effect of the treatment process of the present invention can not be attained. The above described effects can be obtained only by passing the above described fine bubbles as in the present invention in the vicinity of the surface of the materials to be treated with the interface dimension of more than a given amount.

In the electroplating, the precipitated coating is metallic and has good conductivity and also in the compound electroplating, a metallic substance of more than about 70 w/w% is contained and the conductivity is high, so that the heat amount generated in the inner portion of the coating at the electroplating is small. This is different in the function from the dissipation of heat generated in the inner portion of the coating in the anodizing of aluminum or aluminum alloys but in the electroplating, it is important to increase the homogenization of the electrolyte, to lower the concentration gradient and to increase the limiting electric current density and the effect when the present invention is applied to the electroplating depends greatly upon the substantial homogenization of the electrolyte and the conventional various agitating processes only agitate the treating solution at a distance from the surface of the materials to be electroplated and the above described effects have not been obtained. Since Faraday's law of electrolysis is well applied to the electroplating, the increase of the limiting electric current directly becomes increase of the electroplating speed and in the case of electroplating according to the present invention, the coating speed is increased to about more than 2 times as fast as the conventional electroplating and various properties, such as the uniformity of coating and the throwing power are improved.

When the present invention is applied to the electrolytic polishing, it has been confirmed by a bright meter that the polishing brightness is improved. This is because the ultra fine bubbles promote the polishing function and the electric current density distribution becomes uniform. When the bubbles which have been used in the conventional technic are introduced into electrolytic polishing, the flow speed of the polishing solution becomes ununiform due to the large bubble diameter and flow patterns are formed on the polished surface and such a process has not been satisfied.

When the present invention is applied to the electrolytic cutting, the fine bubbles act to effectively carry out the electrolytic products and the cutting speed can be increased and the cut surface is smooth and fine.

The invention will be explained in more detail.

For a better understanding of the invention, reference is taken to the accompanying drawings, wherein.

The following examples are given or the purpose of illustration of this invention and are not intended as limitations thereof.

EXAMPLE 1

Figure 1:
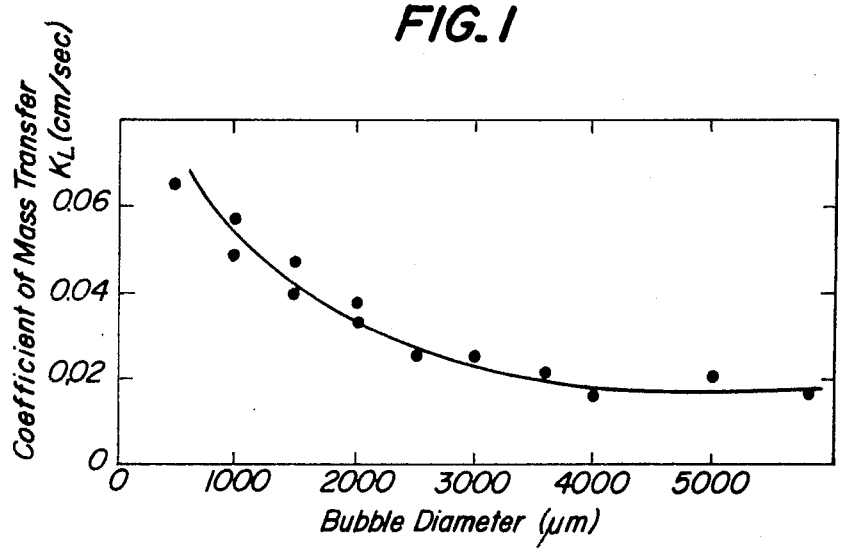
FIG. 1 is a graph showing the relation of the coefficient of mass transfer to the bubble diameter.
Figure 2:
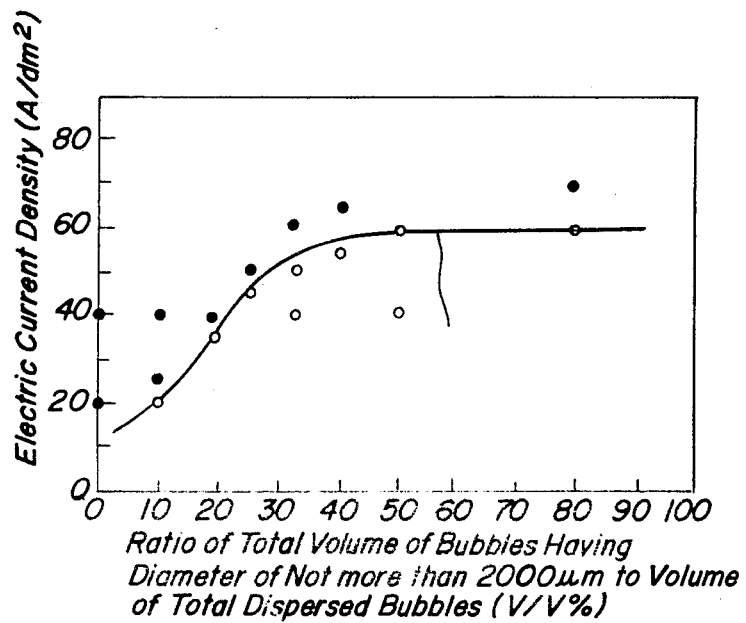
FIG. 2 is a graph showing the appearance distribution when the ratio of the total volume of the bubbles having a diameter of not more than 2,000 $\mu$m to the volume of the total dispersed bubbles and the electric current density are varied.
Figure 3:
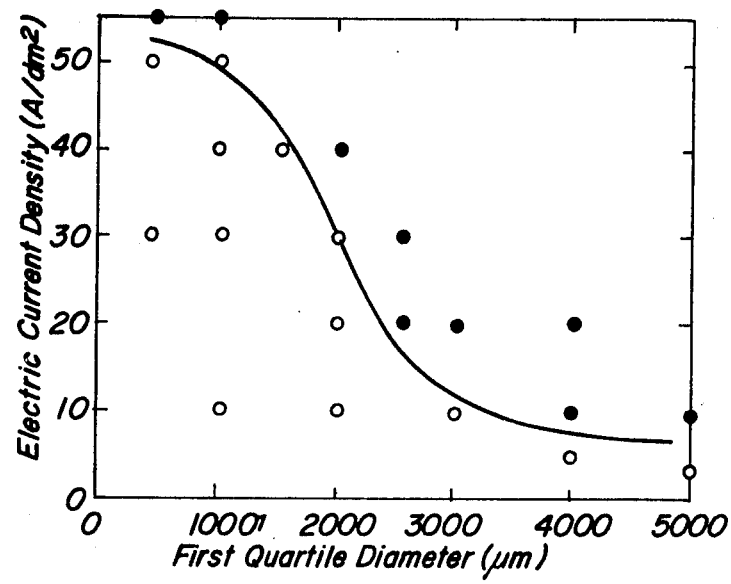
FIG. 3 is a graph showing the appearance distribution when the first quartile diameter and the electric current density are varied.

Anodizings were carried out by using 20 w/v% of aqueous solution of sulfuric acid as the anodizing solution, maintaining the bath temperature at 28°±2° C., using aluminum having a usual purity of JIS-A1050 as a material to be treated, using various porous bodies to form bubbles and varying the electric current density variously with a constant electric current density process. The anodizing intended to obtain about 50 $\mu$m of coating thickness and the diameter of the formed bubbles was measured by the above described photograph process and the results were shown in a diagram as the cumulative distribution of the bubble diameter to determine the first quartile diameter. The obtained results are shown in FIG. 3, the black point shows burning and bad products and the white circle shows the sound condition.

Figure 4:
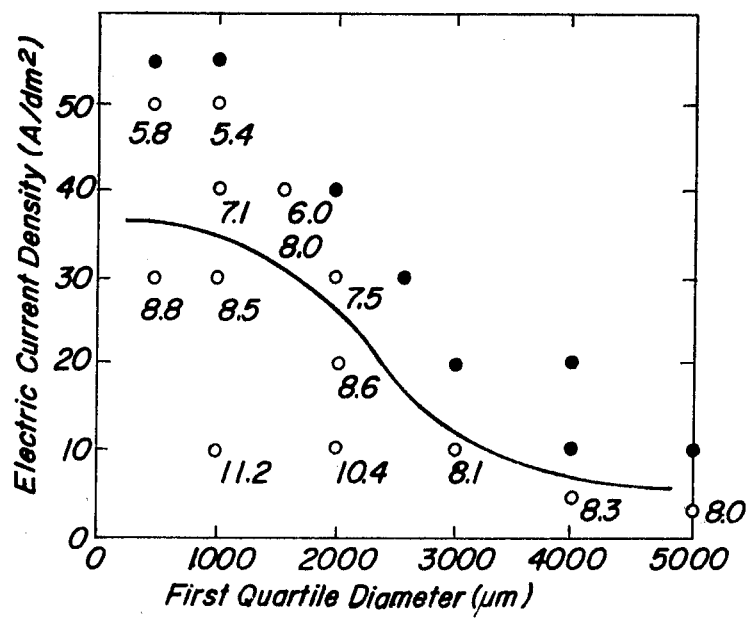
FIG. 4 is a graph showing the distribution of gram weight of carborundum per the coating thickness of the abrasion resistance test when the first quartile diameter and the electric current density are varied.
Figure 5:
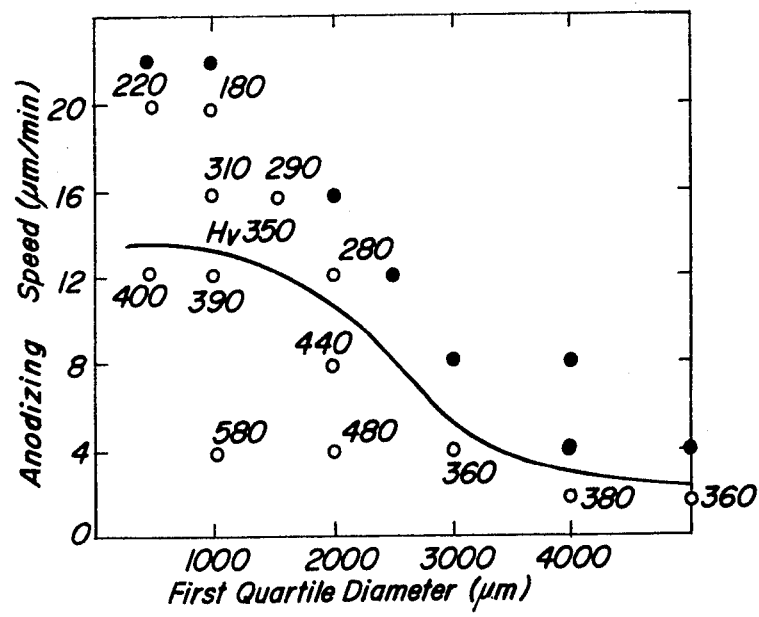
FIG. 5 is a graph showing the hardness distribution against the first quartile diameter and the anodizing speed.

The results of the abrasion resistance test in this case is shown in FIG. 4 and the hardness of the same samples is shown in FIG. 5 wherein the ordinate shows the anodizing speed. The numeral values in FIG. 4 show the weight (gram) of carborundum per micro meter ($\mu$m) of the coating thickness. The numeral values in FIG. 5 show Vicker's hardness. The amount of air supplied in this case was 2 Nl/min.dm$^2$ per the significant bath surface dimension. When the zone of the high abrasion resistance being more than 8 g of carborundum per $\mu$m of the coating thickness is checked from FIG. 4, even 20 A/dm$^2$ of the electric current density can be operated at 2,000 $\mu$m of the first quartile diameter and at 1,000 $\mu$m of the first quartile diameter about 30 A/dm$^2$ of the electric current density can be operated.

FIG. 5 shows that Vicker's hardness of more than 350 can be obtained at the anodizing speed of more than 4 $\mu$m/min at the first quartile diameter of not more than 2,000 $\mu$m. Even in the conventional best technic, the highest anodizing speed of the coating thickness satisfying more than 350 of Vicker's hardness does not exceed 2 $\mu$m/min. Accordingly, the anodizing speed of the present invention exceeds two times as fast as the conventional technic. In this example, the ratio of the dispersed bubbles in the treating solution is b 15±1 v/v%.

EXAMPLE 2

Anodizings were carried out by using various aqueous solutions having the compositions of the treating solution Nos. 1–24 as shown in Table 2 and varying the materials to be treated, the bath temperature, the electric current density and the treatment time. At the treatment condition, the first quartile diameter of the dispersed bubbles in the vicinity of the material to be treated and the ratio (v/v%) of the total dispersed bubbles in the treating solution were measured and after the treatment, the thickness of the anodized coatings formed on the surface of the materials to be treated was measured by an eddy-current instrument for measuring thickness and the hardness was measured by Vicker's hardness meter. These treatment conditions and the results of the above described various measurements are shown in the following Tables 3.

As the cathode in this case, use was made of carbon plates and as the supplied gas, use was made of air at room temperature and the dimension of the surface of the treating solution was 500 mm×400 mm and the depth of the solution to the porous body was about 500 mm.

Table 2(a)

| Treating solution | Composition | |
|---|---|---|
| 1 | $H_2SO_4$ | 5 w/v% |
| 2 | $H_2SO_4$ | 15 w/v% |
| 3 | $H_2SO_4$ | 30 w/v% |
| 4 | $H_2SO_4$ | 50 w/v% |
| 5 | $(COOH)_2 . 2H_2O$ | 4 w/v% |
| 6 | $(COOH)_2 . 2H_2O$ | 20 w/v% |
| 7 | $H_3BO_3$ | 10 w/v% |
| 8 | $CrO_3$ | 3 w/v% |
| 9 | $[CH(OH)COOH]_2$ | 5 w/v% |
| 10 | $CH_3CH(OH)COOH$ | 5 w/v% |

Table 2(b)

| Treating solution | Composition | |
|---|---|---|
| 11 | $C_3H_4(OH)(COOH)_3 . H_2O$ | 5 w/v% |
| 12 | $(CH_2COOH)_2$ | 5 w/v% |
| 13 | $H_3PO_4$ | 10 w/v% |
| 14 | $C_6H_5SO_3H . 2H_2O$ | 5 w/v% |
| 15 | $(NH_4)_2B_4O_7$ | 5 w/v% |
| 16 | $(NH_4)_2CO_3 . H_2O$ | 5 w/v% |
|  | $H_2SO_4$ | 10 w/v% |
| 17 | $(COOH)_2 . 2H_2O$ | 10 w/v% |
|  | $H_2SO_4$ | 10 w/v% |
| 18 | $(COOH)_2 . 2H_2O$ | 1 w/v% |
|  | $H_2SO_4$ | 1 w/v% |
| 19 | $(COOH)_2 . 2H_2O$ | 10 w/v% |
|  | $H_3BO_3$ | 10 w/v% |

Table 2(b)-continued

| Treating solution | Composition | |
|---|---|---|
| 20 | C₃H₄(OH)(COOH)₃ . H₂O | 5 w/v% |
| | TiO(KC₂O₄)₂ . 2H₂O | 40 g |
| | H₃BO₃ | 8 g |
| 21 | C₃H₄(OH)(COOH)₃ . H₂O | 1 g |
| | (COOH)₂ . 2H₂O | 1.2 g |
| | H₂O | 1 l |
| | H₂SO₄ | 30 w/v% |
| 22 | C₃H₅(OH)₃ | 3 w/v% |
| | H₂SO₄ | 30 w/v% |
| 23 | C₃H₅(OH)₃ | 30 w/v% |
| | H₂SO₄ | 1 w/v% |
| 24 | (COOH)₂ . 2H₂O | 10 w/v% |
| | C₃H₅(OH)₃ | 10 w/v% |

Table 3(a)

| Sample No. | Treating solution No. | Material to be treated JIS | Bath temperature °C. | Electric current density A/dm² | Treatment time min | First quartile diameter μm | Ratio of bubbles v/v% | Coating thickness μm | Hardness Hv |
|---|---|---|---|---|---|---|---|---|---|
| Conventional process | 2 | A-1050 | 20 | 1 | 30 | — | 0 | 7.5 | — |
| | 2 | A-1050 | 20 | 2.5 | 30 | — | 0 | (Burning) | — |
| | 2 | A-1050 | 5 | 2.5 | 60 | — | 0 | 38 | 400 |
| | 2 | A-1050 | 5 | 3 | 60 | — | 0 | (Burning) | — |
| | 3 | A-1050 | 30 | 1.5 | 20 | — | 0 | (Powdery) | — |
| 1 | 3 | A-1050 | 30 | 5 | 20 | 270 | 16.7 | 42 | 472 |
| 2 | 3 | A-1050 | 30 | 5 | 60 | 310 | 14.8 | 121 | 470 |
| 3 | 3 | A-1050 | 30 | 5 | 20 | 440 | 14.2 | 41 | 462 |
| 4 | 3 | A-1050 | 30 | 5 | 60 | 440 | 14.2 | 120 | 459 |
| 5 | 3 | A-1050 | 30 | 5 | 20 | 640 | 13.3 | 40 | 457 |
| 6 | 3 | A-1050 | 30 | 5 | 20 | 710 | 13.1 | 40 | 455 |
| 7 | 3 | A-1050 | 30 | 5 | 60 | 710 | 13.1 | 118 | 450 |
| 8 | 3 | A-1050 | 30 | 5 | 20 | 950 | 12.5 | 40 | 400 |
| 9 | 3 | A-1050 | 30 | 5 | 60 | 950 | 12.5 | 115 | 396 |
| 10 | 3 | A-1050 | 30 | 5 | 20 | 1050 | 11.6 | 39 | 366 |
| 11 | 3 | A-1050 | 30 | 5 | 20 | 1420 | 19.4 | 38 | 198 |
| 12 | 3 | A-1050 | 30 | 3 | 20 | 2000 | 17.3 | 22 | 202 |

Table 3(b)

| Sample No. | Treating solution No. | Material to be treated JIS | Bath temperature °C. | Electric current density A/dm² | Treatment time min | First quartile diameter μm | Ratio of bubbles v/v% | Coating thickness μm | Hardness Hv |
|---|---|---|---|---|---|---|---|---|---|
| 13 | 3 | A-1050 | 30 | 10 | 20 | 950 | 12.5 | 76 | 453 |
| 14 | 3 | A-1050 | 30 | 30 | 20 | 710 | 13.1 | 114 | 390 |
| 15 | 3 | A-1050 | 30 | 50 | 20 | 730 | 18.1 | 152 | 180 |
| 16 | 3 | A-1050 | 10 | 5 | 20 | 970 | 12.3 | 40 | 512 |
| 17 | 3 | A-1050 | 10 | 30 | 20 | 970 | 12.3 | 77 | 420 |
| 18 | 3 | A-1050 | 10 | 50 | 20 | 970 | 12.3 | 115 | 330 |
| 19 | 3 | A-1050 | 10 | 70 | 20 | 730 | 12.7 | 154 | 210 |
| 20 | 3 | A-1050 | 30 | 5 | 20 | 940 | 3.5 | 39 | 247 |
| 21 | 3 | A-1050 | 30 | 5 | 20 | 990 | 32.6 | 38 | 251 |
| 22 | 3 | A-1050 | 30 | 5 | 20 | 1030 | 43.3 | 37 | 190 |
| 23 | 3 | A-1050 | 30 | 3 | 20 | 1380 | 55.0 | 21 | 160 |
| 24 | 3 | A-1050 | 40 | 5 | 20 | 930 | 12.7 | 38 | 312 |
| 25 | 3 | A-1050 | 5 | 5 | 20 | 980 | 12.0 | 41 | 554 |
| 26 | 4 | A-1050 | 30 | 5 | 20 | 1250 | 10.7 | 40 | 340 |
| 27 | 2 | A-1050 | 30 | 5 | 20 | 910 | 13.0 | 39 | 414 |
| 28 | 2 | A-1050 | 10 | 5 | 20 | 930 | 12.6 | 40 | 527 |
| 29 | 1 | A-1050 | 30 | 5 | 20 | 900 | 13.2 | 40 | 412 |
| 30 | 1 | A-1050 | 10 | 5 | 20 | 920 | 12.8 | 41 | 520 |

Table 3(c)

| Sample No. | Treating solution No. | Material to be treated JIS | Bath temperature °C. | Electric current density A/dm² | Treatment time min | First quartile diameter μm | Ratio of bubbles v/v% | Coating thickness μm | Hardness Hv |
|---|---|---|---|---|---|---|---|---|---|
| 31 | 3 | A-5052 | 40 | 5 | 20 | 930 | 12.7 | 34 | 332 |
| 32 | 3 | A-5052 | 30 | 5 | 20 | 950 | 12.5 | 38 | 397 |
| 33 | 3 | A-5052 | 30 | 10 | 20 | 950 | 12.5 | 75 | 395 |
| 34 | 3 | A-5052 | 20 | 5 | 20 | 960 | 12.4 | 39 | 401 |
| 35 | 3 | A-5052 | 10 | 5 | 20 | 970 | 12.3 | 39 | 434 |
| 36 | 3 | A-2017 | 30 | 5 | 20 | 950 | 12.5 | 35 | 398 |
| 37 | 3 | A-2017 | 30 | 5 | 60 | 950 | 12.5 | 102 | 386 |
| 38 | 3 | A-6063 | 30 | 5 | 20 | 950 | 12.5 | 40 | 402 |
| 39 | 3 | A-6063 | 30 | 5 | 60 | 950 | 12.5 | 118 | 397 |
| 40 | 3 | A-6063 | 30 | 8 | 20 | 950 | 12.5 | 64 | 421 |
| 41 | 3 | A-7075 | 30 | 5 | 20 | 950 | 12.5 | 36 | 400 |
| 42 | 3 | A-7075 | 30 | 5 | 60 | 950 | 12.5 | 106 | 387 |

Table 3(c)-continued

| Sample No. | Treating solution No. | Material to be treated JIS | Bath temperature °C. | Electric current density A/dm² | Treatment time min | First quartile diameter μm | Ratio of bubbles v/v% | Coating thickness μm | Hardness Hv |
|---|---|---|---|---|---|---|---|---|---|
| 43 | 3 | A-7075 | 10 | 5 | 20 | 970 | 12.3 | 37 | 467 |
| 44 | 3 | A-7075 | 10 | 10 | 20 | 970 | 12.3 | 73 | 453 |
| 45 | 3 | AC3A | 30 | 5 | 20 | 950 | 12.5 | 36 | 365 |
| 46 | 3 | AC3A | 30 | 10 | 20 | 950 | 12.5 | 70 | 354 |
| 47 | 3 | AC8A | 30 | 5 | 20 | 950 | 12.5 | 34 | 367 |
| 48 | 3 | AC8A | 30 | 10 | 20 | 950 | 12.5 | 69 | 361 |
| 49 | 3 | ADC12 | 30 | 5 | 20 | 950 | 12.5 | 35 | 368 |
| 50 | 3 | ADC12 | 10 | 5 | 20 | 970 | 12.3 | 36 | 377 |

Table 3(d)

| Sample No. | Treating solution No. | Material to be treated JIS | Bath temperature °C. | Electric current density A/dm² | Treatment time min | First quartile diameter μm | Ratio of bubbles v/v% | Coating thickness μm | Hardness Hv |
|---|---|---|---|---|---|---|---|---|---|
| 51 | 3 | (23% Si)[1] | 10 | 5 | 20 | 970 | 12.3 | 31 | 372 |
| 52 | 3 | (19% Si)[2] | 10 | 5 | 20 | 970 | 12.3 | 35 | 373 |
| 53 | 3 | (12% Cu)[3] | 10 | 5 | 20 | 970 | 12.3 | 32 | 331 |
| 54 | 3 | (8% Cu)[4] | 10 | 5 | 20 | 970 | 12.3 | 36 | 354 |
| 55 | 5 | A-1050 | 30 | 5 | 20 | 870 | 13.2 | 40 | 473 |
| 56 | 5 | A-1050 | 30 | 10 | 20 | 870 | 13.2 | 79 | 478 |
| 57 | 5 | A-6063 | 30 | 5 | 20 | 870 | 13.2 | 39 | 405 |
| 58 | 5 | A-6063 | 30 | 10 | 20 | 870 | 13.2 | 78 | 408 |
| 59 | 5 | AC3A | 30 | 5 | 20 | 870 | 13.2 | 35 | 367 |
| 60 | 5 | AC5A | 30 | 5 | 20 | 870 | 13.2 | 35 | 369 |
| 61 | 5 | AC8A | 30 | 5 | 20 | 870 | 13.2 | 34 | 368 |
| 62 | 5 | AC8A | 10 | 5 | 20 | 890 | 13.0 | 35 | 387 |
| 63 | 5 | AC8A | 10 | 5 | 60 | 890 | 13.0 | 70 | 389 |
| 64 | 6 | A-1050 | 30 | 5 | 20 | 850 | 13.4 | 40 | 474 |
| 65 | 6 | A-1050 | 30 | 10 | 20 | 850 | 13.4 | 80 | 480 |
| 66 | 6 | A-1050 | 10 | 5 | 20 | 870 | 13.2 | 40 | 410 |
| 67 | 6 | A-1050 | 10 | 5 | 60 | 870 | 13.2 | 79 | 412 |
| 68 | 6 | (23% Si)[1] | 20 | 5 | 20 | 860 | 13.4 | 31 | 373 |
| 69 | 7 | A-1050 | 70 | [50–400V]* | 60 | 850 | 13.5 | 8 | — |
| 70 | 8 | A-1050 | 40 | 3 | 20 | 850 | 13.5 | 15 | — |

*Voltage controlled: the resistivity of the electrolyte is too high to control electric current.
[1] Aluminum alloy containing 23% by weight of silicon.
[2] Aluminum alloy containing 19% by weight of silicon.
[3] Aluminum alloy containing 12% by weight of copper.
[4] Aluminum alloy containing 8% by weight of copper.

Table 3(e)

| Sample No. | Treating solution No. | Material to be treated JIS | Bath temperature °C. | Electric current density A/dm² | Treatment time min | First quartile diameter μm | Ratio of bubbles v/v% | Coating thickness μm | Hardness Hv |
|---|---|---|---|---|---|---|---|---|---|
| 71 | 9 | A-1050 | 60 | 3 | 20 | 840 | 13.7 | 18 | — |
| 72 | 10 | A-1050 | 30 | 3 | 20 | 840 | 13.7 | 20 | — |
| 73 | 11 | A-1050 | 30 | 3 | 20 | 840 | 13.7 | 19 | — |
| 74 | 12 | A-1050 | 30 | 3 | 20 | 840 | 13.7 | 18 | — |
| 75 | 13 | A-1050 | 30 | 3 | 20 | 940 | 12.5 | 14 | — |
| 76 | 14 | A-1050 | 30 | 3 | 20 | 860 | 13.3 | 18 | — |
| 77 | 15 | A-1050 | 30 | 3 | 20 | 860 | 13.3 | 17 | — |
| 78 | 16 | A-1050 | 30 | 3 | 20 | 860 | 13.3 | 17 | — |
| 79 | 17 | AC8A | 30 | 5 | 20 | 860 | 13.3 | 34 | 369 |
| 80 | 18 | AC8A | 30 | 5 | 20 | 880 | 13.1 | 34 | 363 |
| 81 | 19 | AC8A | 30 | 3 | 20 | 860 | 13.3 | 16 | — |
| 82 | 20 | A-1050 | 50 | 3 | 20 | 840 | 13.7 | 18 | — |
| 83 | 21 | A-1050 | 60 | 3 | 20 | 840 | 13.9 | 16 | — |
| 84 | 22 | A-1050 | 30 | 5 | 20 | 880 | 13.0 | 38 | 397 |
| 85 | 22 | A-1050 | 30 | 10 | 20 | 880 | 13.0 | 75 | 402 |
| 86 | 22 | A-1050 | 10 | 5 | 20 | 890 | 13.0 | 39 | 435 |
| 87 | 22 | AC8A | 30 | 5 | 20 | 880 | 13.0 | 34 | 368 |
| 88 | 23 | A-1050 | 30 | 5 | 20 | 810 | 13.3 | 39 | 415 |
| 89 | 23 | A-1050 | 30 | 10 | 20 | 810 | 13.5 | 78 | 417 |
| 90 | 24 | A-1050 | 30 | 5 | 20 | 730 | 13.5 | 39 | 420 |

Table 3(f)

| Sample No. | Treating solution No. | Material to be treated JIS | Bath temperature °C. | Electric current density A/dm² | Treatment time min | First quartile diameter μm | Ratio of bubbles v/v% | Coating thickness μm | Hardness Hv |
| --- | --- | --- | --- | --- | --- | --- | --- | --- | --- |
| 91 | 24 | A-1050 | 30 | 10 | 20 | 730 | 13.5 | 79 | 423 |
| 92 | 24 | A-6063 | 30 | 5 | 20 | 730 | 13.5 | 39 | 405 |
| 93 | 24 | A-7075 | 30 | 5 | 20 | 730 | 13.5 | 37 | 402 |
| 94 | 24 | AC5A | 30 | 5 | 20 | 730 | 13.5 | 36 | 361 |
|  | 3 | A-1050 | 30 | 5 | 20 | 2900 | 15.4 | (Burning) | — |
|  | 3 | A-1050 | 30 | 4 | 20 | 3500 | 8.2 | (Powdery) | — |
| Reference | 3 | A-1050 | 30 | 5 | 20 | 930 | 1.5 | (Burning) | — |
|  | 4 | A-1050 | 30 | 3 | 20 | 1700 | 63 | (Powdery) | — |

*Voltage controlled: the resistivity of the electrolyte is too high to control electric current.
[1]Aluminum alloy containing 23% by weight of silicon.
[2]Aluminum alloy containing 19% by weight of silicon.
[3]Aluminum alloy containing 12% by weight of copper.
[4]Aluminum alloy containing 8% by weight of copper.

EXAMPLE 3

Figure 6:
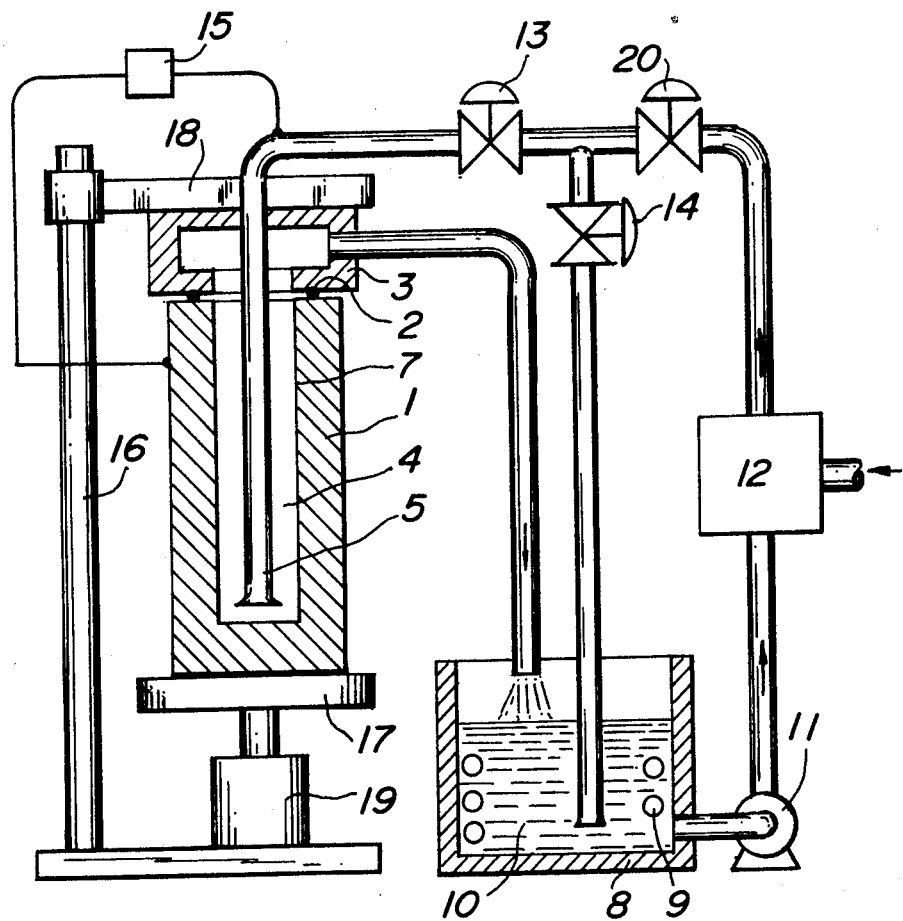
FIG. 6 is a diagram for explaining an apparatus for anodizing only the inner surface of the cavity provided with bottom of the material to be treated and having the cavity provided with bottom, for example the inner cavity portion.

In order to carry out anodizing of only an inner wall of a cavity provided with a bottom of a material to be treated which is provided with an inner cavity portion, an apparatus as explained in FIG. 6 was used.

As shown in FIG. 6, an inlet portion of the cavity of a material 1 to be treated and a partition wall 3 were sealed with a packing 2 to separate the space including the inner portions of the cavity and the outer space of the material to be treated so as not to leak the treating solution, the treating solution mixed with dispersed bubbles was introduced into the inner portion of the bottom of the cavity 4 through the partition wall 3 and discharged into the inner most recess. A feed pipe 5, which acts as an electrode, and a discharge pipe 6 which discharges the used treating solution from the inner space in the vicinity of the inlet to the outer portion are provided and the surface 7 toward the material 1 to be treated of the feed pipe 5 was constituted with a corrosion resistant and conductive material, such as lead. The treating solution 10 charged in a tank 8 wherein the temperature of said solution is adjusted by a device 9 for maintaining the bath temperature, was fed to an apparatus 12 for forming fine bubbles by a pump 11 and to the solution was mixed a gas as dispersed bubbles composed of ultra fine bubbles by means of said apparatus 12 and the flow speed of the treating solution mixed with the dispersed bubbles was adjusted by an adjusting valve 13 and a by-pass valve 14 and was fed into the feed pipe 5. The used treating solution was returned to the tank 8 through the dischare pipe 6 and recycled. A power source 15 was provided between the material 1 to be treated and the feed pipe 5 acting as a counter electrode and a voltage was applied thereto to effect the electrochemical treatment. In order that the inlet portion of the cavity of the material 1 to be treated and the partition wall 3 are sealed by a packing so as not to leak the treating solution, the material 1 to be treated was mounted on a lower support 17 of a press 16 and the upper portion of the partition wall was pressed by an upper plate 18 and the lower support was pressed up by an air cylinder 19.

The treating solution in the inner portion of the cavity 4 after the electrochemical treatment has been completed was recovered into the tank 8 in substantially total amount of the treating solution in the inner portion of the cavity 4 in siphon function by stopping the pump 11, closing a valve 20 and maintaining the adjusting valve 13 and the by-pass valve 14 in the opened state. Furthermore, in order to further decrease an amount of the treating solution remained in the inner portion of the cavity 4 and to make the remained amount smaller, the adjusting valve 13 is provided at the position lower than the bottom of the cavity 4 and a fine pipe which passes through the inner portion of the feed pipe 5 and reaches to the bottom of the cavity 4 is provided from the adjusting valve 13 to the bottom portion of the cavity 4 through the inner portion of the feed pipe 5, whereby the fine pipe also acts as siphon and only a part solution in the fine pipe remains in the cavity 4 and the amount of the used solution remained in the cavity can be made smaller.

Furthermore, by providing a branched pipe before or after the adjusting valve 13, the other liquid, such as water can be similarly introduced into or discharged from the inner portion of the cavity 4, whereby a successive treatment including a pre-treatment and a past-treatment can be continuously carried out.

By using the above described apparatus, anodizings were carried out while observing the outer diameter of the bubbles passing through the vicinity of the surface of the material to be treated by making a part of the material to be treated transparent and while operating the apparatus for forming fine bubbles and valves and by varying the electric current density at the surface of the material to be treated by varying the electrolytic potential and the following results were obtained.

Material to be treated:
  aluminum (JIS-AC8B-F)
Shape of said material:
  Inner diameter of cavity 20 mmφ
  Depth of cavity 200 mm
Composition of treating solution:
  Sulfuric acid 30 w/v% aqueous solution
Temperature of treating solution: 30°±2° C.

Table 4

| Sample No. | First quartile diameter μm | Ratio of bubbles v/v% | Flow speed in feed pipe cm/sec | Electric current density A/dm² | Treatment time min. | Coating thickness μm | Hardness Hv |
| --- | --- | --- | --- | --- | --- | --- | --- |
| 1 | 980 | 15 | 6 | 5 | 20 | 33 | 380 |
| 2 | 980 | 15 | 6 | 30 | 4 | 40 | 330 |
| 3 | 1700 | 15 | 10 | 10 | 20 | 62 | 270 |

Table 4-continued

| Sample No. | First quartile diameter μm | Ratio of bubbles v/v% | Flow speed in feed pipe cm/sec | Electric current density A/dm² | Treatment time min. | Coating thickness μm | Hardness Hv |
|---|---|---|---|---|---|---|---|
| 4 | 1700 | 15 | 10 | 20 | 10 | 63 | 250 |

EXAMPLE 4

Copper sulfate plating was carried out under the following condition.
Copper sulfate $CuSO_4.5H_2O$: 220 g/l
Sulfuric acid $H_2SO_4$: 55 g/l
Chlorine ion $Cl^-$: 40 mg/l
Bath temperature: 30° C.

The obtained results are shown in Tables 5 and 6. Table 5 shows the appearance of copper plating and Table 6 shows electrolytic resistance of the bath.

Table 5

| | | Conventional process | Present invention | |
|---|---|---|---|---|
| First quartile diameter (μm) | | — | 980 | 1,100 |
| Ratio of bubbles (v/v%) | | 0 | 11.7 | 15.0 |
| Electric current density at cathode (A/dm²) | 4 | Bright Smooth Semi-bright | Bright Smooth Bright | Bright Smooth Bright |
| | 8 | Smooth Dark | Smooth Bright | Smooth Bright |
| | 12 | Mat | Smooth Dull bright | Smooth Dull bright |
| | 14 | — | Mat Dark | Smooth Dull bright |
| | 16 | — | Mat | Smooth Dark Mat |
| | 20 | — | — | Smooth Dark Mat |

Table 6

| | First quartile diameter (μm) | Ratio of bubbles (v/v%) | Electric current density at cathode A/dm² | Electrolytic resistance of the bath Ω |
|---|---|---|---|---|
| Conventional process | — | 0 | 4 | 1.93 |
| Present invention | 980 | 11.7 | 4 | 1.44 |
| | 1,100 | 15.0 | 4 | 1.39 |

From Table 5 it can be seen that the limiting electric current density is increased about two times by exposing to gas. Therefore, according to the treatment process of the present invention, it is possible to increase the productivity about two times.

According to Table 6, since the electrolytic resistance of the bath decreases, it is possible to lower the electrolytic potential against the same electric current amount, so that the treatment can be effected by a small electric power and the energy can be saved.

EXAMPLE 5

Copper pyrophosphate plating was effected under the condition as described hereinafter.

In this case, the anode was separated by a diaphragm and exposed to the dispersed bubbles in the same manner as in the cathode (material to be treated).
Copper pyrophosphate: 100 g/l
Copper ion: 30 g/l
Potassium pyrophosphate: 340 g/l
Ammonia water (specific gravity 0.88): 4 ml/l
Bath temperature: 50° C.

The results of the obtained throwing power (%) are shown in the following Table 7.

Table 7

| | | Conventional process | Present invention | | |
|---|---|---|---|---|---|
| First quartile diameter (μm) | | — | 990 | 1,050 | 1,160 |
| Ratio of bubbles (v/v%) | | 0 | 7.2 | 12.0 | 15.2 |
| Electric current density at cathode A/dm² | 2 | 20 dark powder | 19 | 26 | 32 |
| | 6 | | 20 | 31 | 39 |
| | 10 | — | — | 37 | 44 |
| | 14 | — | — | — | 50 |

The above Table 7 shows that the covering power is improved to above two times as high as the conventional process and the current efficiency at anode at the electric current densities at cathode of 2 A/dm², in the case of the ratio of bubbles being 0, 7.2, 12.0 or 15.2 v/v% is 40, 68, 87 and 90% respectively and the current efficiency at anode is noticeably improved.

EXAMPLE 6

In order to examine the effect to the throwing power of nickel plating under the following bath condition, Haring cell test was carried out.

In this case, the Haring cell has no bottom and the cell was arranged just above the porous body forming bubbles.
Nickel sulfate: 240 g/l
Nickel chloride: 30 g/l
Boric acid: 30 g/l
Sodium 1,5-nephthalene-disulfonate: 1 g/l
2 butyne-1,4-diol: 0.1 g/l
pH: 4
Bath temperature: 55° C.
Size of electrode: 50×20 mm
Ratio of distance between electrodes: 5:1

The obtained results are shown in the following Table 8.

Table 8

| No. | | First quartile diameter (μm) | Ratio of bubbles (v/v%) | Total current A | Throwing power % |
|---|---|---|---|---|---|
| Conventional process | | — | 0 | 0.2 | 39 |
| | | — | 0 | 0.6 | 41 |
| Present | 1 | 960 | 10.5 | 0.2 | 75 |
| | 2 | 960 | 10.5 | 0.6 | 72 |

Table 8-continued

| No. | | First quartile diameter (μm) | Ratio of bubbles (v/v%) | Total current A | Throwing power % |
|---|---|---|---|---|---|
| invention | 3 | 1,030 | 14.7 | 0.2 | 71 |
| | 4 | 1,030 | 14.7 | 0.6 | 69 |

From Table 8, it can be seen that the throwing power is improved. Therefore, the uniformity of the plating is improved according to the treatment of the present invention.

EXAMPLE 7

Chromium plating was effected under the following condition and the current efficiency (%) at cathode and the appearance were determined.
Chromic anhydride: 250 g/l
Sulfuric acid: 2.5 g/l
Trivalent chromium ion: 5 g/l
Bath temperature: 40° C.
Treatment time: 15 minutes
The obtained results are shown in Table 9.

TAble 9

| | First quartile diameter (μm) | Ratio of bubbles (v/v%) | Electric current density at cathode A/dm² | Current efficiency at cathode % | appearance |
|---|---|---|---|---|---|
| Conventional process | — | 0 | 10 | 9.0 | Milky |
| | — | 0 | 20 | 14.5 | Bright |
| | — | 0 | 30 | 16.6 | Gray |
| | 920 | 13.4 | 10 | 14.2 | Bright |
| | 920 | 13.4 | 20 | 16.3 | Bright |
| | 920 | 13.4 | 30 | 19.0 | Bright |
| Present invention | 920 | 13.4 | 40 | 22.6 | Bright |
| | 920 | 13.4 | 50 | 25.4 | Bright Silver |
| | 920 | 13.4 | 60 | 25.5 | bright |
| | 920 | 13.4 | 70 | 25.2 | Silver white |

As seen from Table 9, the expansion of the bright range and the increase of the limiting electric current density are noticeable and the current efficiency at cathode is improved. In this case, the improvement of throwing power also was recognized. These facts enable to decrease the number of experts and the machining number for providing the conventional auxiliary anode. Accordingly, the productivity and the quality are improved according to the present invention.

EXAMPLE 8

In order to determine the effect to the limiting electric current density for bright of tin-nickel alloy plating under the following condition, Hull cell test was carried out. The Hull cell had no bottom and said Hull cell was arranged just above the porous body.
Stannous chloride: 30 g/l
Nickel chloride: 30 g/l
Potassium pyrophosphate: 220 g/l
Glycine: 20 g/l
Mercaptobenzothiazole: 5 ml/l (0.4 w/v% solution): 5 ml/l
Bath temperature: 25° C.
Treatment time: 5 minutes
The obtained results are shown in the following Table 10.

Table 10

| | First quartile diameter (μm) | Ratio of bubbles (v/v%) | Bright limiting electric current density (A/dm²) | Tin content (w/w%) |
|---|---|---|---|---|
| Conventional process | — | 0 | 1.0 | 67.0 |
| Present invention | 900 | 8.0 | 2.0 | 66.5 |
| | 940 | 11.8 | 2.5 | 67.1 |
| | 990 | 15.0 | 3.2 | 67.4 |

From Table 10 it can be seen that the increase of the bright limiting electric current density is recognized and the composition of the coated alloy does not vary. Therefore, the productivity of the alloy plating is improved according to the treatment of the present invention.

EXAMPLE 9

Compound electroplating reinforced by dispersing alumina fine particles in nickel plated coating was effected under the following condition.
Nickel sulfamate: 600 g/l
Nickel chloride: 5 g/l
Boric acid: 40 g/l
Alumina (particle size 0.3–1.5 μm): 50 g/l
Bath temperature: 60° C.
Electric current density: 40 A/dm²
Treatment time: 60 minutes
First quartile diameter: 1,200 μm
Ratio of bubbles: 20 v/v%
The thickness of the coating obtained by this treatment was 2,600 μm and the appearance was dull bright but smooth and the improvement of the performance of more than 5 times in the abrasion resistance as compared with the coating which is not reinforced by dispersing alumina fine particles was recognized. As the analysis, alumina fine particles were contained in the content of about 15% and it was found that the particles were uniformly dispersed. An electroforming mold was prepared with this treatment process. When an electroforming mold was prepared by this treatment process and a heat resistant and flame resistant molding was formed by using a mixed resin of polyvinyl chloride mixed with 20 w/w % of glass beads and ABS, the abrasion resistance of the mold was about 5 times as high as that of the conventional nickel electroforming mold and the corrosion resistance was improved more than about 4 times and the durable life of the mold was elongated.

This shows that according to the treatment of the present invention, the effect is developed in the dispersing and reinforcing plating and the commercially valuable effect can be brought about.

EXAMPLE 10

Electrolytic refining of copper was effected as the electrochemical treatment according to the present invention. The treatment condition and the results are shown in the following Table 11.

Table 11

|  | Conventional process | Present invention |
|---|---|---|
| Electrolyte solution |  |  |
| Copper (g/l) | 46.1 | 45.7 |
| Sulfuric acid (g/l) | 180 | 179 |
| Solution temperature (°C.) | 55 | 50 |
| Electric current density (A/dm$^2$) | 2 | 4 |
| Current efficiency (%) | 93 | 95 |
| Rate of anode slime | 0.86 | 0.63 |
| First quartile diameter (μm) | 1,850 | — |
| Ratio of bubbles (v/v%) | 5 | 0 |

As seen from the above Table 11, according to the treatment of the present invention the sound treatment can be effected without deteriorating the current efficiency and the slime rate, even if the electric current density is increased as compared with the conventional treatment and the treating speed becomes about 2 times.

The refined cathode plate was few in nodule and stripe and was smooth.

EXAMPLE 11

To electrolyte polishing of the material to be treated which is composed of carbon steel (JIS-S55C) for mechanical structure was applied the method of the present invention. The treatment condition is shown in the following Table 12.

Table 12

|  | Conventional process | Present invention |
|---|---|---|
| Treating solution |  |  |
| Sulfuric acid (w/v%) | 40 | 40 |
| Glycerine (w/v%) | 40 | 40 |
| Temperature (°C.) | 50 | 40 |
| Electric current density (A/dm$^2$) | 50 | 70 |
| First quartile diameter (μm) | — | 1,800 |
| Ratio of bubbles (v/v%) | 0 | 20 |
| Treatment time (min.) | 5 | 3 |

After the treatment was effected under the above described condition, the appearance was compared. When one obtained according to the treatment of the present invention was compared with one obtained according to the conventional process, smut was not remained and the product of the present invention was smooth and beautiful, and smaller in the decrease of weight, shorter in the treatment time and lower in the heating temperature of the treating solution.

EXAMPLE 12

A material composed of tool carbon steel was made to be an anode and a tool composed of carbon was made to be a cathode and direct current of 10 V was applied between both the electrodes and the distance between both the electrodes was held to be 0.6 mm and a treating solution consisting of 15 w/v% of sodium chloride and 5 w/v% of citric acid was fed into the space between both the electrodes in an average flow speed of 15 m/sec and the electrolysis was effected. When the treatment was effected by containing about 10 v/v% of fine bubbles (the first quartile diameter of 1,500 μm) in the treating solution, the feed speed was permitted to be 7 mm/min.

In the conventional treatment wherein the fine bubbles according to the present invention are not contained in the treating solution, if the current density was raised so as to increase the feed speed to more than 3 mm/min., the electrolyte solution boiled and the discharge occured and the treatment became infeasible.

Accordingly, in this example, the treatment was able to be effected in a speed of 2 times as high as the conventional process.

As mentioned above in detail, it has been found that when the present invention is applied to the anodizing, the electrolytic voltage can be increased as in Ohm's law by increasing the limit of the electric current density and that when the dispersed bubbles to be used in the present invention are introduced into the anodizing even in the same electric current density, the electrolytic potential is further increased.

When the insoluble electrode having the same quality as the cathode is used as the anode, even if the above described dispersed bubbles are introduced into the treating solution, the electrolytic potential at the same electric current density is not substantially varied but only in the case where the material to be anodized is made to be anode, the electrolytic potential at the same electric current density, when the above described dispersed bubbles are introduced into the treating solution, is noticeably increased. When the ratio of the dispersed bubbles in the treating solution is varied or the introduction of the dispersed bubbles is interrupted, the electrolytic potential noticeably varies corresponding thereto, so that this effect is apparent.

From the fact that the variation of the electric resistance in the treating solution due to the introduction of the dispersed bubbles according to the present invention is not recognized when the anode is the same quality as the cathode, it is considered that this effect is due to the fact that when the bubbles in the above described dispersed bubbles move in contact with the coating surface, the inlets of the fine pores which are current paths of the porous layer of the coating, are blocked for a short time, so that the electrolytic resistance of the blocked fine pores temporarily increase or that the formation reaction is influenced. In the agitating of the treating solution owing to the pores in the conventional technic, it has been difficult to temporarily block the fine pores of the coating but the bubbles used in the present invention, when they move in contact with the fine pores of the coating, cavitation function occurs and the treating solution in the fine pores is moved by reciprocating pump function and the electric double layers present in the formation surface are influenced and the thickness of the layer becomes thin and the ratedetermining factor of the formation reaction is improved. At the same time, the electric current flows pulsatory by the passage of the bubbles in contact with the inlets of the fine pores and the movement of the electrolyte in the fine pores becomes vigorous and the pulsatory field is caused on the barrier layer and the formation reaction at the barrier layer can be efficiently effected. Thus, the limit of the electric current density is increased to improve the treatment speed and thicken the barrier layer.

Accordingly, the number of the fine pores per unit area of the coating decreases and the coating becomes dense, so that the hardness increases and the abrasion resistance is improved.

When the present invention is applied to the electrolytic precipitation or electrolytic dissolution, as mentioned above the treatment speed is increased and the productivity is not only increased, but also the quality of the treated product is improved and the present invention is commercially very advantageous.

What is claimed is:

1. An anodizing process in which a current density of 3–170 A/dm$^2$ is applied while forming bubbles in a treating solution at a temperature of 0°–100° C., which comprises containing 2–60 V/V% of dispersed bubbles having first quartile diameter being not more than 2,000 $\mu$m in the treating solution.

2. The process as claimed in claim 1, wherein the first quartile diameter is not more than 1,000 $\mu$m.

3. The process as claimed in claim 1, wherein the treating solution contains 2–30 v/v% of dispersed bubbles.

4. The process as claimed in claim 1, wherein the treating solution is at least one acid selected from the group consisting of sulfuric acid, oxalic acid, phosphoric acid, benzenesulfonic acid, sulfamic acid, boric acid, ammonium borate, citric acid, tartaric acid, formic acid, succinic acid and chromic acid.

5. The process as claimed in claim 4, wherein the acid is sulfuric acid or oxalic acid.

6. The process as claimed in claim 1, wherein the anodizing is effected by using at least one metal selected from the group consisting of aluminum, aluminum alloys, beryllium, beryllium alloys, magnesium, magnesium alloys, titanium, titanium alloys, zirconium and zirconium alloys as one of the electrodes.

7. The process as claimed in claim 6, wherein the metal is selected from the group consisting of aluminum and aluminum alloys.

8. An electrolytic precipitation process in which a current density of 3–170 A/dm$^2$ is applied while forming bubbles in a treating solution at a temperature of 0°–100° C., which comprises containing 2–60 V/V% of dispersed bubbles having first quartile diameter being not more than 2,000 $\mu$m in the treating solution.

9. The process as claimed in claim 8, wherein the electrolytic precipitation is electrolytic plating.

10. The process as claimed in claim 8, wherein the electrolytic precipitation is electrolytic refining.

11. The process as claimed in claim 8, wherein the first quartile diameter is not more than 1,000 $\mu$m.

12. The process as claimed in claim 8, wherein the treating solution contains 2–30 V/V% of dispersed bubbles.

13. An electrolytic dissolution process in which a current density of 3–170 A/dm$^2$ is applied while forming bubbles in a treating solution at a temperature of 0°–100° C., which comprises containing 2–60 V/V% of dispersed bubbles having first quartile diameter being not more than 2,000 $\mu$m in the treating solution.

14. The process as claimed in claim 13, wherein the electrolytic dissolution is electrolytic polishing.

15. The process as claimed in claim 13, wherein the electrolytic dissolution is electrolytic machining.

16. The process as claimed in claim 13, wherein the first quartile diameter is not more than 1,000 $\mu$m.

17. The process as claimed in claim 13, wherein the treating solution contains 2–30 V/V% of dispersed bubbles.

* * * * *